United States Patent [19]

Harpman et al.

[11] 4,023,538
[45] May 17, 1977

[54] HOT FUEL GAS GENERATOR

[75] Inventors: Webster B. Harpman, Poland, Ohio; Fred G. Mahoney, Pittsburgh, Pa.

[73] Assignee: Econo Fuel Systems, Inc., Latrobe, Pa.

[22] Filed: July 30, 1976

[21] Appl. No.: 710,195

Related U.S. Application Data

[63] Continuation-in-part of Ser. No. 625,565, Oct. 24, 1975.

[52] U.S. Cl. .................................. 123/3; 123/25 R; 123/25 P; 123/25 B; 123/25 D; 123/34 A; 123/133; 123/122 F; 48/102 A; 48/103; 48/94; 48/180 H; 48/184; 261/18 A; 261/142; 261/145; 261/DIG. 68

[51] Int. Cl.² ......................................... F02B 43/08

[58] Field of Search ................ 261/18 A, 142, 145, 261/69 A, DIG. 68, 16; 48/102 R, 102 A, 103, 105, 106, 94, 95, 180 H, 180 P, DIG. 8, 184; 123/1 A, 3, 25 B, 25 D, 122 E, 122 F, 133, 25 R, 25 P, 34 A

[56] References Cited

UNITED STATES PATENTS

| | | | |
|---|---|---|---|
| 1,110,482 | 9/1914 | Collier | 123/122 F |
| 2,272,341 | 2/1942 | Holzapfel | 123/133 |
| 2,285,905 | 6/1942 | Cunningham et al. | 261/16 |
| 2,745,727 | 5/1956 | Holzapfel | 48/184 |
| 2,754,185 | 7/1956 | Ensign | 48/184 |
| 2,894,829 | 7/1959 | Harrison et al. | 48/184 |
| 3,915,669 | 10/1975 | Minoza | 123/133 |
| 3,968,775 | 7/1976 | Harpman | 123/25 B |

*Primary Examiner*—S. Leon Bashore
*Assistant Examiner*—Peter F. Kratz
*Attorney, Agent, or Firm*—Webster B. Harpman

[57] ABSTRACT

A hot fuel gas generator for an internal combustion engine simultaneously vaporizes gasoline and water in a multi-chambered heated pressure vessel having built in regulators for controlling pressure and volume and delivers the resulting superheated steam and gaseous fuel to the internal combustion engine downstream from the usual carburetor. A single device operating at a very high temperature, for example 1600° F., is used for the simultaneous vaporization of the fuel and water to develop desirable working pressure and volume. The high temperature steam and gaseous fuel positions the fuel molecules at the greatest degree of separation from each other providing the greatest opportunity for contact of the oxygen, the reacting species in the gaseous condition as chemical reactions occur only between particles at the atomic or molecular level and it is necessary for the reacting species to be in actual contact at the time of reaction. The hot fuel gas produced therefore enables complete combustion and the elimination of the atmospheric pollutants common in the operation of internal combustion engines and increases the energy obtained from the fuel.

7 Claims, 3 Drawing Figures

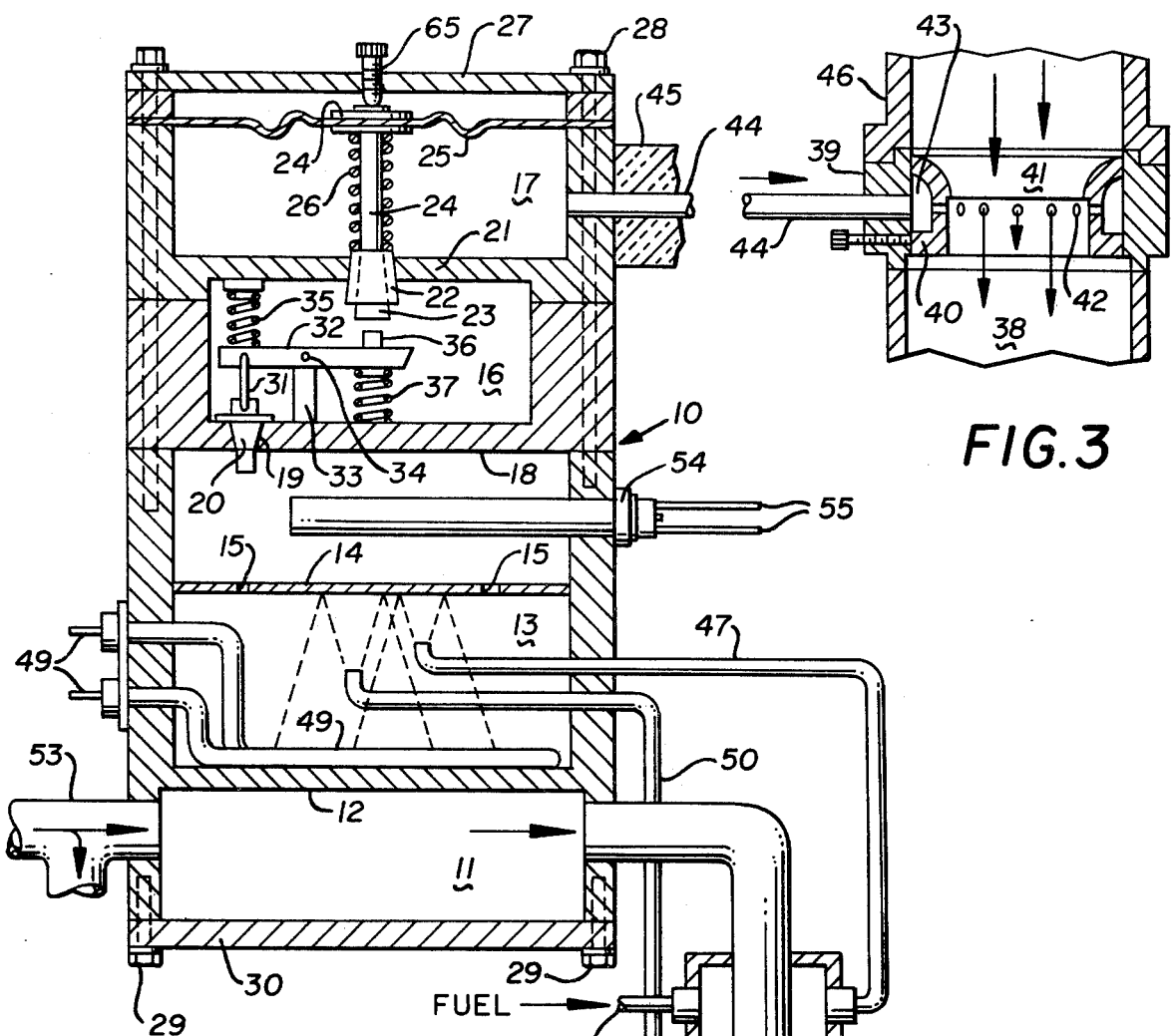
FIG. 3
FIG. 1
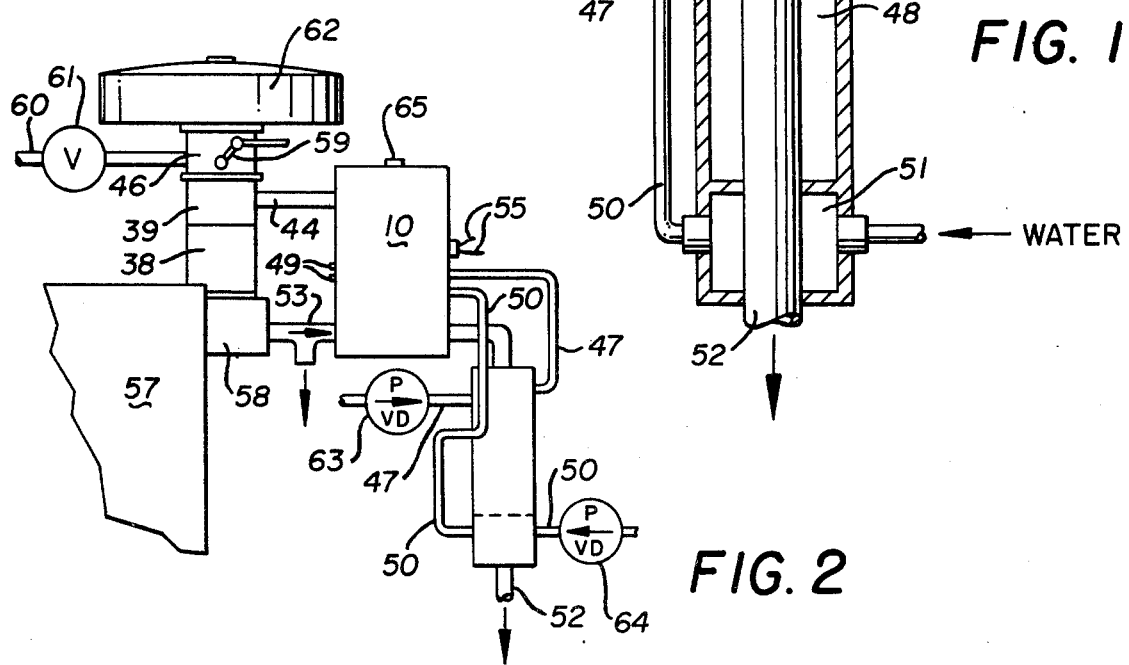
FIG. 2

HOT FUEL GAS GENERATOR

This is a continuation in part of our co-pending application Ser. No. 625,565, filed Oct. 24, 1975.

BACKGROUND OF THE INVENTION

1. FIELD OF THE INVENTION

This invention relates to fuel systems and vaporizing devices therein for internal combustion engines, and more particularly fuel gas generators.

2. DESCRIPTION OF THE PRIOR ART

Fuel systems for internal combustion engines have generally used carburetors in which gasoline is sprayed into a stream of air and divided into a series of fine droplets approaching vaporization and conveyed to the point of combustion. Only those molecules at the surface of the gasoline droplets are in a position to react with another species and incomplete combustion results because the very short time allowed is insufficient for more than a little vaporization of the fuel to occur. The prior art engines therefore exhaust large quantities of unburned hydrocarbons, carbon monoxide and oxides of nitrogen all of which are undesirable atmospheric pollutants. Several attempts to improve vaporization may be seen in U.S. Pats. Nos. 1,110,482; 2,585,171; 2,285,905 and 2,272,341.

This invention simultaneously vaporizes the liquid fuel and water at very high temperatures so that fuel mixture in its heated pressurized gaseous state achieves practically complete combustion in the internal combustion engine due to the spacing of the molecules resulting from the heat and the superheated steam.

SUMMARY OF THE INVENTION

A hot fuel gas generator having a novel high temperature and pressure controlled heated vaporizer is disclosed in which gasoline and water are simultaneously vaporized to produce a hot gaseous fuel under pressure and regulated as to temperature volume and flow is in direct communication with the inlet manifold of the engine. The usual carburetor adds fuel for starting only and continuously controls the combustion air and regulates the same to provide throttle control. The partial vaccum resulting from the operation of the internal combustion engine moves the combustion air with the proper quantity of the hot gaseous fuel from the generator to the areas of combustion in the engine. The complete vaporization of the liquid fuel and the water is caused by high temperature heat from an external source under controlled pressure and volume conditions. Gasoline or order fuel in a ratio of 80% –90% to water 10% –20% makes a highly satisfactory hot gaseous fuel.

DESCRIPTION OF THE DRAWINGS

FIG. 1 is a cross sectional side elevation of the hot fuel gas generator;

FIG. 2 is a diagrammatic illustration of a fuel system for an internal combustion engine and incorporating the generator of FIG. 1, and FIG. 3 is a cross sectional side view of a fuel introducing fitting used in the fuel system of FIG. 2.

DESCRIPTION OF THE PREFERRED EMBODIMENT

By referring to the drawings and FIG. 1 in particular it will be seen that the hot fuel gas generator comprises a multi-chambered pressure vessel in the form of a hollow body member generally indicated by the numeral 10, the lowermost portion of which has a heat exchange chamber 11 therein, a separating partition 12 and a flash vaporization chamber 13 immediately thereabove. A thin walled partition 14 apertured in an annular pattern as at 15 divides the flash vaporization chamber into upper and lower parts and forms a deflector against which gasoline or another fuel and water are directed as hereinafter described. The upper portion of the multi-chambered pressure vessel 10 forms a vapor chamber 16 directly adjacent the flash vaporization chamber 13 and its uppermost part and a manifold pressure responsive chamber 17 is positioned immediately thereabove. A partition 18 separates the chambers 13 and 16 and has an inwardly and downwardly tapered opening 19 therethrough in which a first tapered valve element 20 is operatively positioned and arranged so that it will move upwardly and thereby partially open the opening 19 upon an increase of pressure in the chamber 13 as hereinafter described. Twelve PSI pressure is normal.

A partition 21 separates the chambers 16 and 17 and has an opening therethrough in which a tapered valve seat member 22 defining a tapered bore is positioned, the bore tapering upwardly and inwardly toward the manifold pressure responsive chamber 17. An inverted tapered valve element 23 is positioned in the tapered valve seat member 22 and is carried by a stem 24 which extends upwardly to a point of attachment 24 in the center of a diaphragm 25. A coil spring 26 is positioned around the stem 24 and between the diaphragm 25 and the uppermost portion of the tapered valve seat member 22 and normally urges the diaphragm 25 upwardly toward a closure 27 which forms the top of the manifold pressure responsive chamber 17. Elongated fasteners 28 join the closure 27 and the upper parts of the multi-chambered pressure vessel 10 as will be understood by those skilled in the art and fasteners 29 secure a bottom closure 30 to the lower end thereof to form the heat exchange chamber 11.

Still referring to FIG. 1 of the drawings, it will be seen that the uppermost end of the first tapered valve element 20 is joined by a link 31 to one end of a balance bar 32 which is pivoted to a support 33 by a pivot 34. A second coil spring 35 is positioned between one end of the balance bar 32 and the partition 21 and normally urges the link 31 and the first tapered valve element 20 downwardly into closed position with respect to the opening 19 in the partition 18. The other end of the balance bar 32 has a boss 36 on its upper surface and immediately therebelow a third coil spring 37 is positioned between the balance bar 32 and the partition 18. The springs 35 and 37 prevent undesirable oscillation of the first tapered valve element 20 and yet enable it to be responsive in operation to pressures generated within the flash vaporization chamber 13 as well as to reduce pressures in the manifold pressure responsive chamber 17.

By referring to FIG. 3 of the drawings, it will be seen that an upper tubular portion 38 of an inlet manifold or communicating part thereof is partially disclosed and that it is in communication with an adaptor ring 39 which has an annular collar 40 the uppermost portion of which is inwardly and downwardly curved to form an annular throat 41 which ends immediately above a plurality of circumferentially spaced openings 42 in the annular collar 40 and communicates with an annular chamber 43 therein. The annular chamber 43 communicates with a tube 44 which in turn extends directly to and communicates with the manifold pressure responsive chamber 17 of the multi-chambered pressure vessel 10. The tube 44 is preferably insulated as at 45.

Still referring to FIG. 3 of the drawings it will be seen that the lower tubular portion of a conventional carburetor 46 is shown in registry with the upper portion of the adaptor ring 39 and the throat 41 therein so that air flowing downwardly from the carburetor and an air cleaner thereabove as indicated by the arrows in FIG. 3 will move downwardly through the throat 41 of the annular collar 40 and downwardly through the connecting portion 38 of the inlet manifold of the internal combustion engine.

Those skilled in the art will observe that negative pressures existing in the inlet manifold as a result of the movement of the pistons in the cylinders of the internal combustion engine are extended by the adaptor ring 39 to both the carburetor 36 and the manifold pressure responsive chamber 17 of the multi-chambered pressure vessel 10 hereinbefore described. The diaphragm 25 in the chamber 17 thus responds to the degree of such negative pressure by moving downwardly and opening the inverted tapered valve element 23 with respect to the tapered valve seat member 22 in like degree.

Referring again to FIG. 1 of the drawings, it will be seen that a gasoline or other liquid fuel delivery tube 47 extends from a preheater 48 to a point within the flash vaporization chamber 13 where it is directed upwardly toward the thin walled partition 14 and the central unbroken area thereof. Liquid fuel delivered against this thin walled partition is thereby deflected downwardly as indicated by the broken lines against a coiled heating element 49 which is an electrical resistance coil in an insulating medium such as glass as for example the commercially available Calrod elements as used in domestic electric ranges and the like. The ends of the coiled heating element 49 extend outwardly through a side wall of the multi-chambered pressure vessel 10 and are connected to a source of electrical energy such as for example a modified alternator that will maintain a desirable uniform voltage despite fluctuations in the revolutions per minute rate of the internal combustion engine driving the alternator. It has been determined that a 115 volt alternator arranged to produce a satisfactory even voltage at a suitable amperage operates the coiled heat exchaner 49 satisfactorily and maintains a surface temperature of between 1600° F. to 1800° F. which is necessary to maintain a desired temperature in the flash vaporization chamber to insure flash vaporization of water and gasoline or other fuel directed thereinto. A second tube 50 also extends into the flash vaporization chamber 13 and water is delivered therethrough as from a preheater 51 and the arrangement of the tube 50 and its direction against the thin walled partition 14 is the same as that of the tube 47 hereinbefore described. In order that the preheaters 48 and 51 for the gasoline and the water will operate as such, an extension of an exhaust pipe 52 is positioned therethrough, the extension of the exhaust pipe 52 communicates with the heat exchanger chamber 11 at one side thereof and with a tube 53 at the other side thereof which communicates directly with the exhaust manifold of the internal combustion engine. Arrows in the exhaust pipe 52 and the tube 53 indicate the flow of the exhaust through the heat exchanger chamber 11 and the preheaters 48 and 51 respectively.

In order that the desired operating temperature may be maintained within the flash vaporization chamber 13, a thermostat 54 is positioned partially therein and the electrical switches actuated thereby are in connection with circuit wires 55 extending therefrom.

By referring now to FIG. 2 of the drawings, a diagrammatic illustration of a fuel system for an internal combustion engine incorporating the hot fuel gas generator of this invention may be seen wherein an internal combustion engine 57 has an inlet manifold 38 and an exhaust manifold 58 with the adaptor ring 39 in communication with the inlet manifold 38 and the carburetor 46. Movable linkage 59 on the carburetor 46 provides a conventional throttle control of the engine 57. Gasoline or other fuel is supplied to the carburetor 46 by a supply tube 60 controlled by a valve 61 and air is supplied the carburetor 46 by an air cleaner 62. Gasoline or other suitable fuel is supplied the tube 47 by a variable discharge pump 63 which like the valve 61 is electrically operated and water is supplied the tube 50 by a variable discharge pump 64 which is also preferably electrically actuated. An adjustment screw 65 is shown on the uppermost surface of the multi-chambered pressure vessel 10 and by referring back to FIG. 1 of the drawings, it will be seen that its inner end is engaged against the upper surface of the center of the diaphragm 25 so that a desirable adjustment of the inverted tapered valve element 23 can be provided as necessary for satisfactory idling of the internal combustion engine.

OPERATION

Operating an internal combustion engine with the device of the invention in a fuel system as described herein requires first starting the engine with the operation of the carburetor 46 by supplying it with gasoline through the tube 60 by opening the valve 61. Simultaneously the variable delivery pumps 63 and 64 are started as by way of an interconnecting electrical circuit, not shown, and the coiled heat exchanger 49 is energized. The starter, not shown, is energized to move the pistons in the internal combustion engine and air flows downwardly from the air cleaner 62 through the carburetor 46, the daptor ring 39 and the inlet manifold 38 and the engine starts in its usual manner, thus operating conventionally with the carburetor 46 which provides a rich suitable starting fuel. After a few seconds, usually from fifteen to thirty seconds, the valve 61 may be closed shutting off the supply of gasoline to the carburetor 46 as by this time a suitable volume of hot fuel gas has been generated in the multiple chambered pressure vessel 10 and is being moved into the adaptor ring 39 by way of the pipe 44 so that the engine continues its operation on the hot fuel gas which is highly gasified compared with the starting mixture that had been supplied by the carburetor 46. The carburetor 46 continues its function in controlling air necessary for combustion and the usual throttle linkage 59 remains the same. The exhaust of the engine or part of it as desired, is delivered to the heat exchanger chamber 11 where it supplements the heat being supplied by the coiled heat exchanger 49 in maintaining the necessary 1600° F. to 1800° F. in the flash vaporization chamber 13.

Delivery of the gasoline or other fuel (and kerosene operates practically as efficiently) to the vaporization chamber 13 results in its flash vaporization and rapid pressurization of the chamber 13 which of course extends upwardly through the apertures 15 in the thin walled partition 14. A build up of the pressure and volume in the chamber 13 causes the first tapered valve element 20 which has a flat area bottom portion, to move upwardly in the opening 19 and this action is controlled by the springs 35 and 37 operating on the opposite ends of the balance bar 32. The tension of the springs 35 and 37 is such that a satisfactory working pressure is maintained in the flash vaporization chamber 13 and this extends into the valve chamber 16 at a flow rate and in a volume as required by the internal combustion engine which is being supplied from the manifold pressure responsive chamber 17. As the engine fuel demand increases, the change of manifold pressure flexes the diaphragm 25 downwardly and opens the inverted tapered valve element 23 in relative greater degree to supply the same. A substantial downward movement of the valve element 23 causes its bottom to engage the boss 36 on the balance bar 32 which accelerates and/or increases the opening of the first tapered valve element 20 to thereby increase the volume and pressure and flow of the hot fuel gas into the valve chamber 16. Rapid fluctuations in the diaphragm and the valve 23 responsive to rapidly changing demands of the engine as occasioned by speeding up and slowing down the same are not directly communicated to the first tapered valve element 20 and an even and desirable flow and volume of hot fuel gas is thus maintained.

It will thus be seen that the multi-chambered pressure vessel performs a number of useful and highly desirable functions in first flash vaporizing the water and fuel and forming a superheated fuel gas which is then stored in sufficient volume and at sufficient pressure to provide for the demands of the internal combustion engine with which the device is being used. The arrangement of the valves are such that they respond in a pressure and volume regulating action which matches the fuel demand of the engine.

Tests of conventional automobiles and engines equipped with the hot fuel gas generator as disclosed herein show near zero levels of atmospheric pollutants in the exhaust which eliminates the need of any catalytic convertors or other devices which attempt to treat the effect and not the cause. The tests also indicate a very substantial increase in the miles per gallon obtained from the hot gas fuel generated by the device of the invention as compared with the same amount of fuel supplied the same engine in the same vehicle through the conventional carburetor and it will be apparent to those skilled in the art that the use of the hot fuel gas generator disclosed herein will enable the automotive engineers to considerably increase the efficiency and performance of the conventional automobile engines by again increasing the compression ratio and changing the timing as the present compression ratios and timing have seriously affected performance, horse power and torque in attempting to eliminate atmospheric pollutants.

Those skilled in the art will also observe that fuel additives may be used if desired although anti-knocking additives are not necessary as the hot fuel gas generated by the device of the invention results in a sufficiently slow burn of a highly gasified fuel to avoid knocking tendencies. It will also be apparent that decomposition of a fuel molecule may occur without combustion occuring unless there is sufficient time and sufficient oxygen. Such decomposition (pyrolysis) produces products which may be more toxic than the original fuel and the elimination of the possibility of such pyrolysis products in the exhaust may be achieved by insuring as complete combustion as possible with the invention hereinbefore described.

Although but one embodiment of the present invention has been illustrated and described, it will be apparent of those skilled in the art that various changes and modifications may be made therein without departing from the spirit of the invention, and having thus described our invention what we claim is.

We claim:

1. A generator for producing superheated fuel gas for an internal combustion engine having an intake manifold, said generator comprising a multi-chambered vertical pressure vessel, at least two horizontal and substantially parallel partitions in said pressure vessel defining said chambers, separate means for simultaneously continuously injecting known amounts of gasoline and water into a first one of said chambers and controlling the amounts thereof, electrical heating means in said first chamber for generating and maintaining surface temperatures between 1600° F. and 1800° F., one of said partitions being between said first chamber and a second one of said chambers and having an opening therein, a first valve element in said opening arranged for movement partially into said second chamber upon a known increase of pressure in said first chamber, means normally biasing said first valve element to a closed position in said opening, a second one of said partitions being between said second one of said chambers and a third one of said chambers and having a secondary opening therein, a second valve element in said secondary opening arranged for movement partially into said second chamber, a diaphragm horizontal disposed in said third chamber, said diaphragm dividing said third chamber into two portions, an extension of said second valve element secured to said diaphragm for movement thereby and means normally biasing said second valve element into closed relation with said secondary opening, tubular means establishing communication between said third chamber and said inlet manifold, said tubular means communicating with the third chamber between said diaphragm and said second partition, said diaphragm being movable responsive to pressure changes in said inlet manifold so as to move said second valve element toward said second chamber when said manifold pressure drops.

2. The generator set forth in claim 1 and wherein a third horizontal partition is positioned in said first one of said chambers between said heating means and said partition between said first chamber and said second chamber, an area of said third partition being unbroken and apertures formed in other areas thereof and wherein said means for injecting said gasoline and water are directed toward said unbroken area of said third partition so that the same acts as a deflector in breaking up and scattering said gasoline and water over the surface of said heating means.

3. The generator set forth in claim 1 and wherein a third horizontal partition is positioned in said first one of said chambers between said heating means and said partition between said first chamber and said second chamber, an area of said third partition being unbroken and apertures formed in other areas thereof and wherein said means for injecting said gasoline and water are directed toward said unbroken area of said third partition so that the same acts as a deflector in breaking up and scattering said gasoline and water over the surface of said heating means and wherein a temperature and pressure responsive device is positioned in said first chamber between said third partition and the partition between said first chamber and said second chamber.

4. The generator set forth in claim 1 and wherein the electrical heating means is a coiled electrical resistance unit having an insulating body.

5. The generator set forth in claim 1 and wherein said openings in said partitions are tapered and said first and second valve elements are tapered for registry therein.

6. The generator set forth in claim 1 and wherein the means normally biasing the first valve element to a closed position includes a bar, support means connected to said first partition and pivotally engaging said bar between its ends, a link connecting said valve element to one end of said bar and a spring positioned between said bar at said one end and said second partition and a boss on the other end of said bar located for registry with said second valve element when the same is moved into said second chamber so as to tilt said bar and move said valve element away from said opening.

7. The generator set forth in claim 1 and wherein an adjustment screw is positioned in said pressure vessel for engagement with said diaphragm opposite said extension of said second valve element whereby said diaphragm and said second valve element may be adjustably positioned to provide a partial open position for idling control of said internal combustion engine.

* * * * *